United States Patent [19]

Hallstrom, Jr.

[11] Patent Number: 5,088,595
[45] Date of Patent: Feb. 18, 1992

[54] WATERPROOF RECIPROCATING CONVEYOR

[76] Inventor: Olof A. Hallstrom, Jr., 1920 Hallstrom Rd., Tillamook, Oreg. 97141

[21] Appl. No.: 628,517

[22] Filed: Dec. 17, 1990

[51] Int. Cl.$^5$ .............................................. B65G 25/04
[52] U.S. Cl. .................................. 198/750; 414/525.1
[58] Field of Search ................. 198/750; 414/525.1, 414/525.9

[56] References Cited

U.S. PATENT DOCUMENTS

| | | | |
|---|---|---|---|
| 4,492,303 | 1/1985 | Foster | 198/750 |
| 4,727,978 | 3/1988 | Hallstrom | 198/750 X |
| 4,940,132 | 7/1990 | Foster | 198/750 |

Primary Examiner—D. Glenn Dayoan
Attorney, Agent, or Firm—Olson & Olson

[57] ABSTRACT

A reciprocating conveyor includes a plurality of elongated, load-supporting reciprocative slats mounted on a plurality of elongated, liquid-impervious slat-mounting base members secured side-by-side across a supporting frame. The adjacent sides of adjacent base members are interconnected by a waterproof seal, whereby the assembly of base members forms a waterproof floor under the reciprocative slats. A liquid collection receptacle is mounted on the frame adjacent one end of the base assembly to receive the liquid content of a load supported on the slats, and a drive mechanism for reciprocating the slats is contained within the receptacle and connected to the reciprocative slats through slots formed in the base members above the collection receptacle.

7 Claims, 4 Drawing Sheets

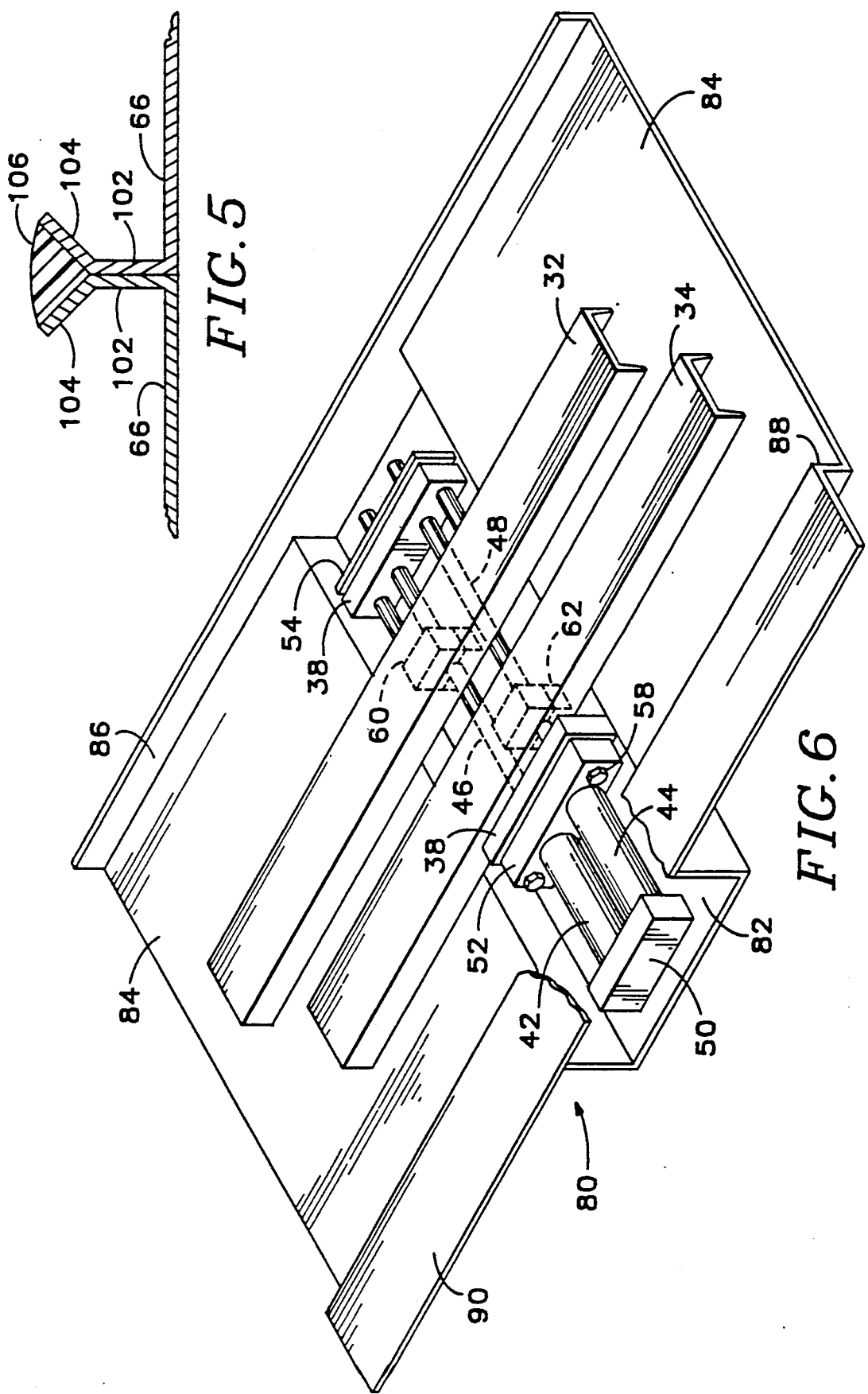

WATERPROOF RECIPROCATING CONVEYOR

BACKGROUND OF THE INVENTION

This invention relates to reciprocating conveyors of the slat type, and more particularly to a slat-type reciprocating conveyor that is capable of supporting and transporting liquid-containing loads without loss of liquid through the conveyor slats.

Many forms of slat-type reciprocating conveyors have been provided heretofore. Typical of these are disclosed in my U.S. Pat. Nos. 3,534,875; 4,143,760; 4,144,963; and 4,856,645; and my copending patent application Ser. No. 07/603,058 filed 25 Oct. 1990 and entitled DRIVE CONNECTOR FOR RECIPROCATING CONVEYOR.

However, none of the prior slat-type reciprocating conveyors has been capable of supporting and transporting liquid-containing loads without leaking some liquid through the conveyor slats. Since current transport regulations prohibit such leaking of liquid onto the roadways, it is important that a waterproof reciprocating conveyor be made available to the transport industry.

SUMMARY OF THE INVENTION

The reciprocating conveyor of this invention utilizes a slat assembly in which a plurality of elongated, imperforate slat-mounting bases are arranged side-by-side on a supporting framework with adjacent longitudinal edges of adjacent bases interconnected by a liquid tight seal, thereby forming a liquid tight base under a plurality of elongated, longitudinally reciprocative slats mounted thereon.

It is the principal objective of this invention to provide a reciprocating conveyor of the slat type which prevents liquid from escaping through the slats.

Another object of this invention is the provision of a slat-type conveyor of the class described which overcomes the aforementioned limitations of the slat-type reciprocating conveyors of the prior art.

A further objective of this invention is the provision of a slat-type conveyor of the class described which is of simplified construction for economical manufacture, maintenance and repair.

The foregoing and other objects and advantages of this invention will appear from the following detailed description, taken in connection with the accompanying drawings of preferred embodiments.

BRIEF DESCRIPTION OF THE DRAWINGS

FIG. 5 is a fragmentary sectional view of an alternative form of seal between adjacent base support members.

FIG. 6 is a top perspective view of the liquid collecting receptacle and drive assembly shown in FIG. 2.

DESCRIPTION OF THE PREFERRED EMBODIMENTS

Figure 1:
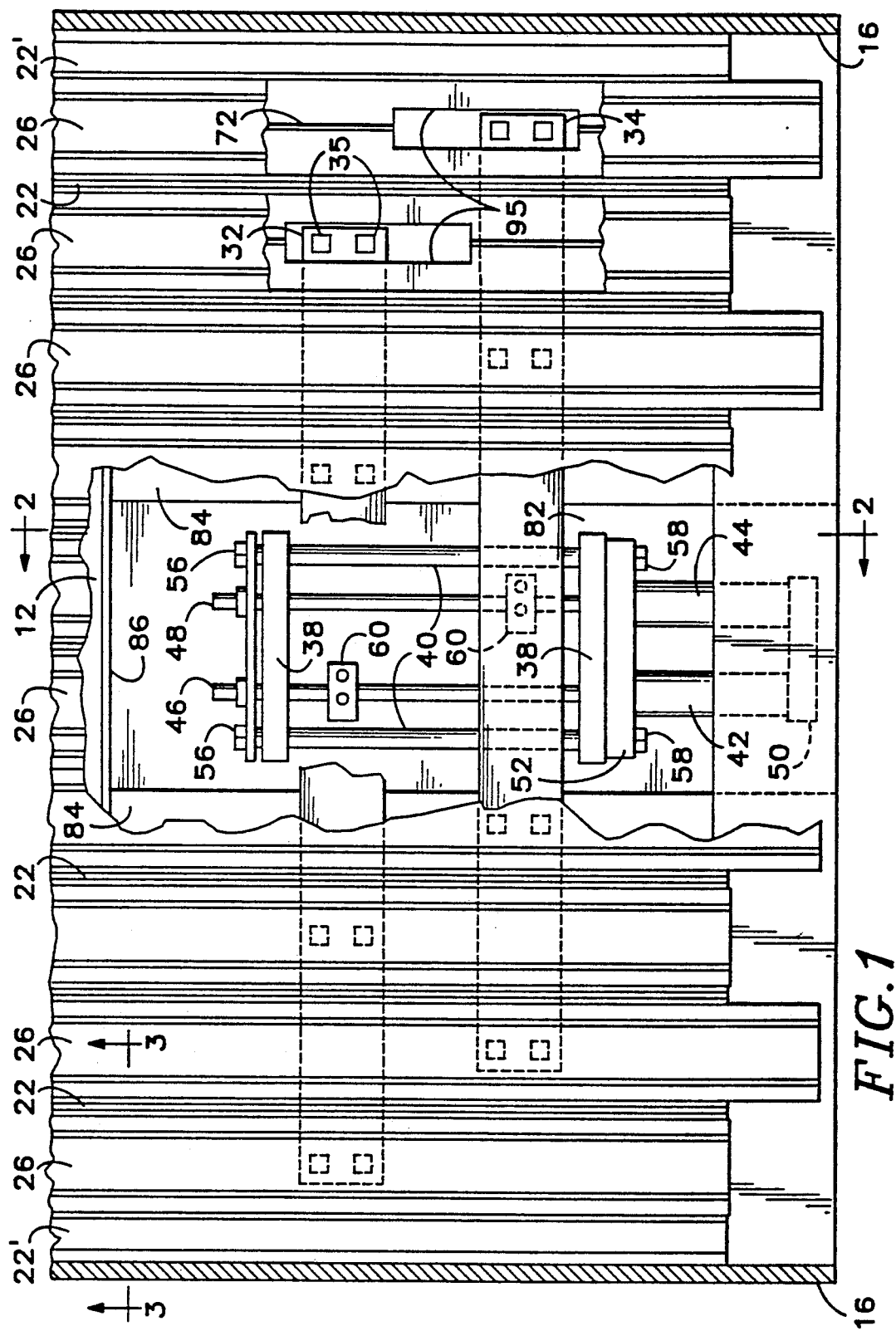
FIG. 1 is a fragmentary, foreshortened plan view of a slat type reciprocating conveyor embodying the features of this invention.

FIG. 1 illustrates the type of reciprocating conveyor disclosed in detail in my U.S. Pat. No. 4,856,645 and in my copending patent application identified hereinbefore. The reciprocating conveyor is illustrated as being integrated with a transport trailer 10 formed of a plurality of transversely extending frame beams 12 secured in longitudinally spaced apart arrangement to laterally spaced longitudinally extending frame beams 14. The trailer also is provided with side walls 16 and rear doors 18, and is supported for transport on wheels 20.

In the embodiment illustrated in FIG. 1, and as described in detail in my patent and application aforesaid, a plurality of elongated fixed slats 22 are integrated with lateral base sections 24, as by metal extrusion. The base sections are supported upon and secured to the transverse beams 12 of the conveyor frame, as by anchor rivets 25. The fixed slats are disposed in alternate arrangement with a plurality of elongated reciprocative slats 26. The reciprocative slats are secured releasably to the base sections against vertical displacement by elongated flexible clips 28 (FIG. 3) which also serve as lubricating bearings for enhancing the reciprocative movement of the reciprocative slats relative to the fixed slats. For this purpose the clips are made of synthetic resin or other suitable material having a low coefficient of friction. The clips are secured to the fixed slats against longitudinal displacement by such means as the rivets 30.

The reciprocative slats 26 are arranged in groups and each group is connected to a different transverse drive beam. In the illustrated embodiment there are two groups of reciprocative slats and therefore two drive beams 32 and 34.

As illustrated, the reciprocative slats 26 are releasably attached to their associated transverse drive beams 32 and 34 by clamp bolts 35 (FIG. 1) the enlarged heads of which are received in the slot formed between the inturned bottom ends 36, of angle clamp brackets 36, as described in detail in the patent application previously mentioned.

Also as described in detail in the patent application aforesaid, the power drive for the slat drive beams is formed as a drive module. The drive module support frame is formed of a pair of transverse beams 38 spaced apart longitudinally by a pair of laterally spaced, longitudinally extending tubular beams 40.

Since the conveyor illustrated in FIG. 1 includes two drive beams 32 and 34, the power drive system includes two fluid pressure piston-cylinder drive units, preferably hydraulic, for operative association with the two drive beams. The cylinders 42 and 44 of the drive units are associated with cooperative piston rods 46 and 48, respectively. The cylinders of the drive units are joined at their head ends by a transverse connector beam 50 and at their rod ends by a transverse connector beam 52. Openings in the module beams 38 and beam 52 freely receive therethrough the piston rods extending from the cylinders, and a similarly apertured transverse plate 54 freely receives the piston rods adjacent their outer ends. Elongated bolts 56 and 58 extend removably through registering openings in the transverse beams 38 and 52 and plate 54 and into internal threaded ends in the tubular beams 40 to clamp the power drive module removably to the module support frame.

Each piston rod is connected to its associated slat drive beam 32 and 34 by clamp blocks 60 and 62 which are provided with confronting half round grooves for receiving the piston rod, the clamp blocks being secured detachably together by clamp bolts 64, in the manner described in detail in the patent application aforesaid.

Figure 3:
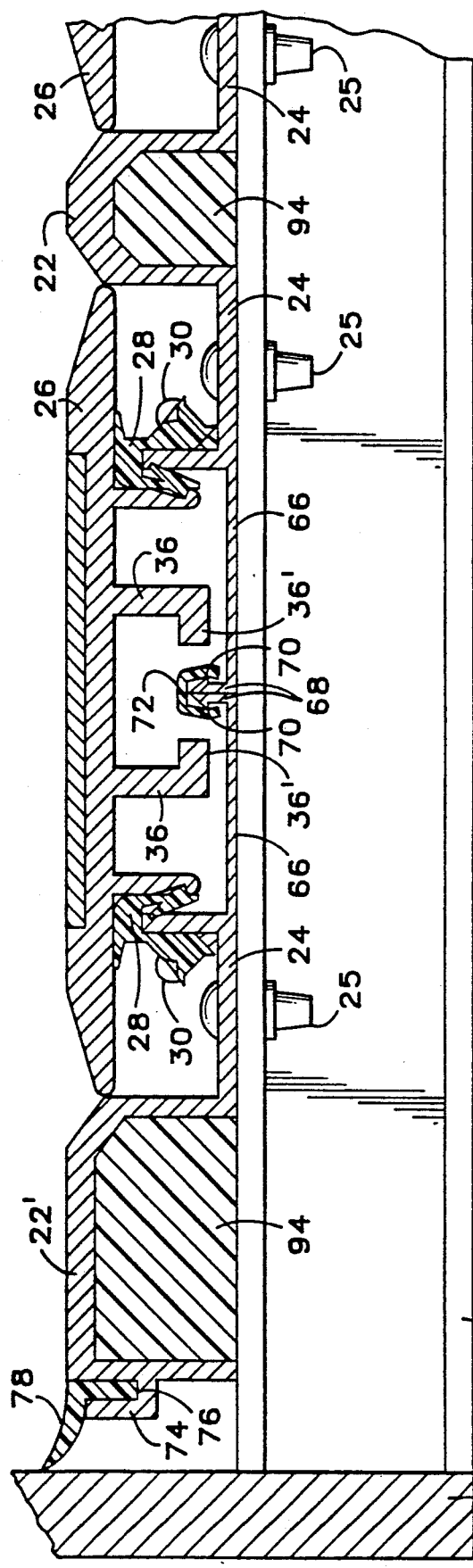
FIG. 3 is a fragmentary transverse section taken on the line 3—3 in FIG. 1.

In accordance with this invention, each of the lateral base sections 24 of the fixed slats 22 is provided with a lateral extension 66 which terminates in an upwardly extending vertical flange 68. In the preferred embodiment illustrated, the upper end portion of each flange is provided with a lateral spur 70. Referring primarily to FIG. 3 of the drawings, the adjacent, substantially abutting sides of adjacent flanges 68 are interconnected by an elongated, substantially U-shaped flexible seal 72 which overlies and bridges the upper portions of the adjacent vertical flanges and is secured removably against inadvertent upward displacement by the spurs 70. The flexible seal is formed of water impervious synthetic resin, rubber, or other suitable material that serves to join the vertical flanges 68 together and form a watertight seal therebetween. Accordingly, it will be apparent that the seals 72 join all of the lateral extensions 66, whereby the associated lateral base sections 24 and fixed slats 22 form a waterproof base which extends the full width of the conveyor frame.

The fixed slat 22' adjacent each of the opposite side walls of the trailer is configured with an outer flange 74 which provides a slot 76 in which to anchor the projecting web of a flexible side seal 78. The seal extends laterally into resilient abutment with the inner surface of the side wall 16, to provide a watertight seal therebetween. The lateral dimension of the seal 78 accommodates a degree of variation in the spacing of the fixed slat from the side wall 16 and thus accommodates installation of the reciprocating conveyor on trailer and other frames in which the distance between side walls may vary over a limited range.

Figure 2:
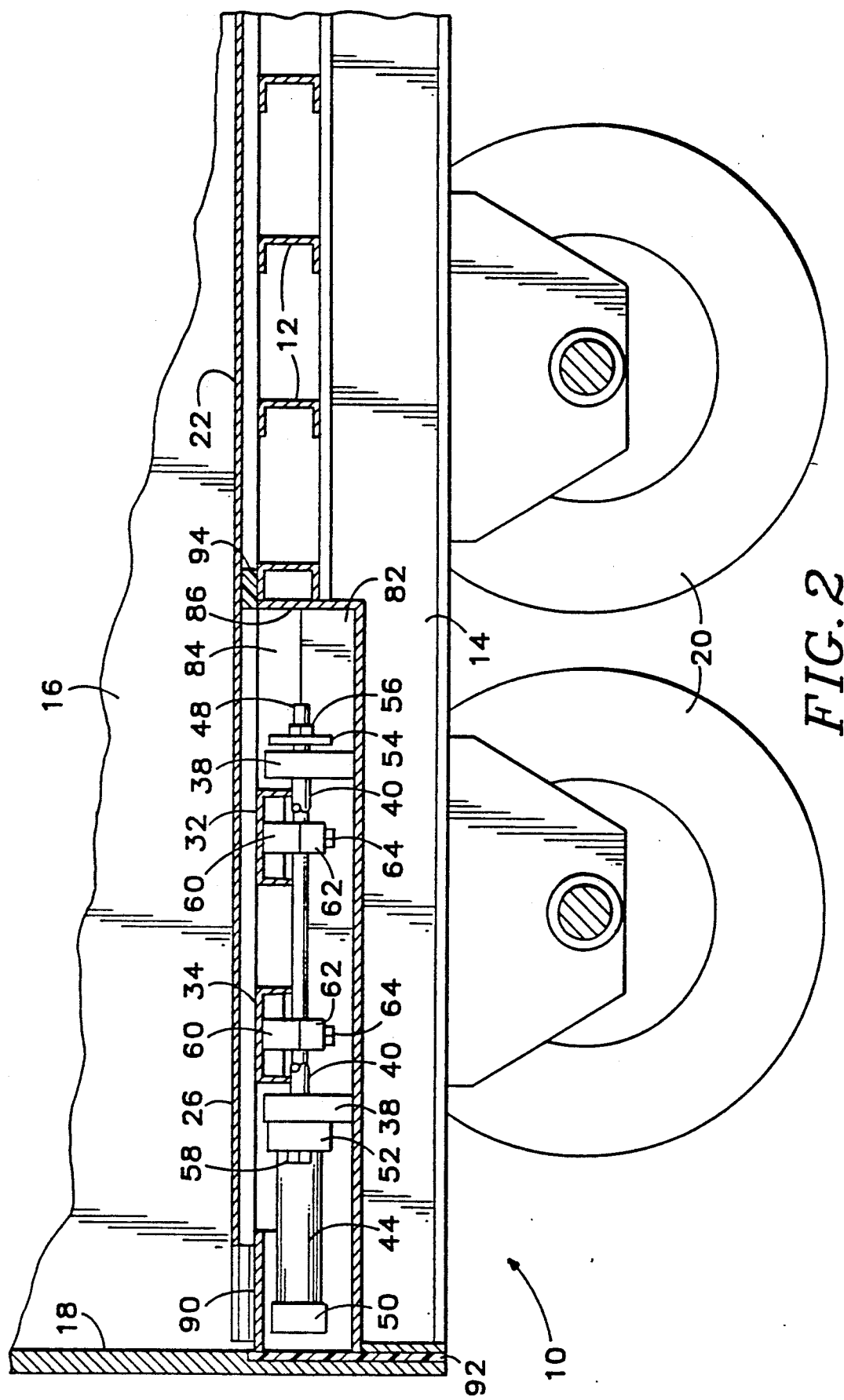
FIG. 2 is a fragmentary, longitudinal section taken on the line 2—2 in FIG. 1.

Referring now primarily to FIGS. 1, 2 and 6 of the drawings, it is to be noted that a rearward portion of the assembly of fixed slats 22, base sections 24 and lateral extensions 66 terminates slightly forward of the rearward end of the trailer frame, and overlies a liquid collection receptacle 80 which extends the full width of the trailer frame. The receptacle is formed of a sheet of water impervious metal configured to provide a central, longitudinally extending trough 82 between laterally extending side trays 84. The receptacle includes a front transverse wall 86 and a rear transverse wall 88 from which a rear floor 90 extends to the rear end of the trailer frame. The rear edge of the rear floor and center trough 82 are disposed for abutment by a watertight seal 92 on the inner surfaces of the rear doors 18.

The drive module is contained within the center trough 82 of the collection receptacle and the drive beams 32 and 34 traverse the side trays 84. Since the sides of the collection receptacle are sealed against the longitudinal side frame beams 14 of the trailer and the front wall 86 is sealed against the underside of the assembly of fixed slats 22, the liquid content of a load carried on the reciprocating conveyor will collect in the receptacle 80 and be retained therein when the rear doors 18 of the trailer are closed against the rear end of the receptacle. Sealing plugs 94 are secured within the rearward ends of the hollow fixed slats 22 at the front wall 86 to prevent the liquid from escaping forwardly of the receptacle.

It is to be noted from FIGS. 1 and 2 that the reciprocative slats 26 extend rearwardly across the collection receptacle 80, to effect movement of the load outward through the open rear end of the trailer. The connecting bolts 35 extend downwardly from their enlarged heads (captured between the inturned ends 36') through longitudinally elongated slots 95 formed by removing portions of the fixed slats 22 and base sections 24 sufficient to allow reciprocation of the drive beams 32 and 34 through their full range.

Figure 4:
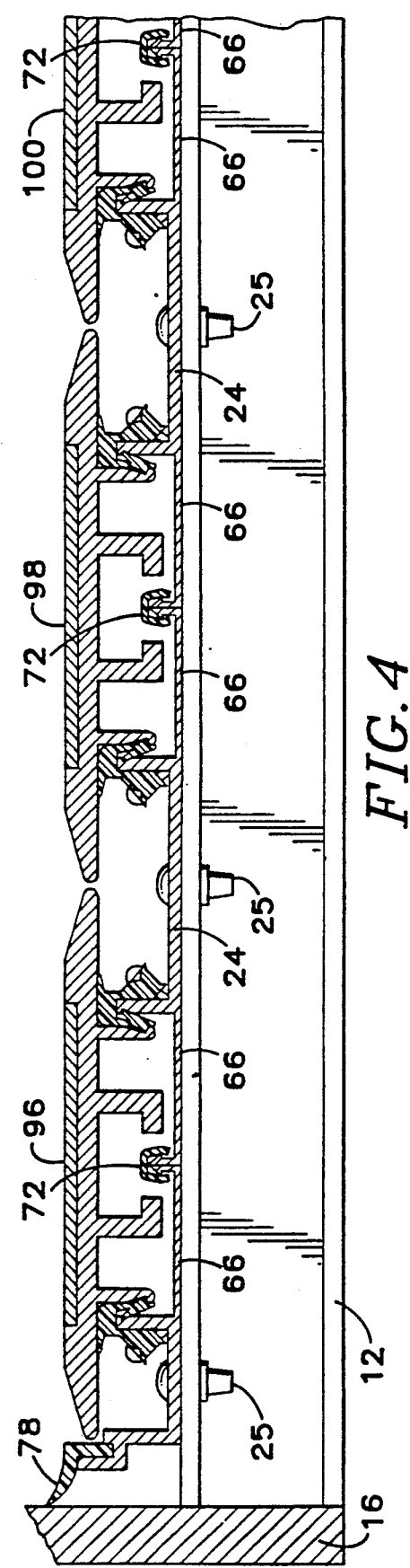
FIG. 4 is a fragmentary transverse section, similar to FIG. 3, showing an alternative slat and slat mounting base assembly embodying the features of this invention.

FIG. 4 illustrates the type of reciprocating conveyor described in my earlier U.S. Pat. No. 4,143,760 previously mentioned. This conveyor is formed of at least one group of at least three elongated slats 96, 98 and 100 which are mounted side-by-side on a conveyor frame for longitudinal reciprocation by a fluid pressure drive mechanism operated to move all of the slats of each group from a start position simultaneously in a load-conveying direction and then to move the slats of each group sequentially in the opposite direction from the advanced position back to the start position, all as described in detail in the patent aforesaid. In this embodiment the fixed slats 22 are omitted and the lateral base sections 24 are joined together directly. This is the area in which the anchor rivets are shown to be disposed in FIG. 4.

FIG. 5 illustrates an alternative form of watertight seal from the U-shaped sealing strip 72 described hereinbefore. Thus, in FIG. 5 the vertical flange 102 at the outer sides of the lateral extensions 66 of each base member has an angularly offset upper section 104. This section is offset inwardly relative to the associated base section, whereby the abutting vertical flanges of adjacent base sections forms a trough therebetween for the reception and containment of a waterproof mastic 106. This mastic serves the same purpose as the U-shaped seal 72 in providing a watertight seal between adjacent imperforate slat-mounting base members.

It will be apparent to those skilled in the art that various changes may be made in the size, shape, type, number and arrangement of parts described hereinbefore, without departing from the spirit of this invention and the scope of the appended claims.

I claim:

1. A slat-type reciprocating conveyor, comprising:
   a) an elongated frame,
   b) a plurality of elongated, imperforate, slat-mounting base members secured side-by-side across the frame,
   c) seal means interengaging the longitudinal sides of adjacent base members and forming a waterproof seal therebetween,
   d) a plurality of elongated load-supporting slats supported on the base members for longitudinal reciprocation, and
   e) drive means supported by the frame and engaging the slats for reciprocating said slats.

2. The reciprocating conveyor of claim 1 including a liquid collection receptacle mounted on the frame below the base members and extending from one end of the base members for receiving the liquid content of a load supported on the conveyor.

3. A slat-type reciprocating conveyor, comprising:
   a) an elongated frame;
   b) a plurality of elongated, imperforate, slat-mounting base members secured side-by-side across the frame, the longitudinal sides of the base members including upwardly extending flanges, c) seal means interengaging the said flanges of the longitudinal sides of adjacent base members and forming a waterproof seal therebetween, d) a plurality of elongated load-supporting slats supported on the base members for longitudinal reciprocation and e) drive means supported by the frame and engaging the slats for reciprocating said slats.

4. The reciprocating conveyor of claim 3 wherein the seal means comprises an elongated strip of waterproof material bridging the upper portions of adjacent flanges.

5. The reciprocating conveyor of claim 3 wherein the adjacent flanges of adjacent base members diverge upwardly and form a trough between them, and the seal means comprises a waterproof mastic material contained in said trough.

6. A slat-type reciprocating conveyor, comprising:
(a) an elongated frame,
(b) a plurality of elongated, imperforate, slat-mounting base members secured side-by-side across the frame,
(c) seal means interengaging the longitudinal sides of adjacent base members and forming a waterproof seal therebetween,
(d) a plurality of elongated load-supporting slats supported on the base members for longitudinal reciprocation,
(e) drive means supported by the frame and engaging the slats for reciprocating said slats, and
(f) a liquid collection receptacle mounted on the frame and extending form one end of the base members for receiving the liquid content of a load supported on the conveyor, the liquid collection receptacle containing the drive means.

7. A slat-type reciprocating conveyor, comprising:
(a) an elongated frame,
(b) a plurality of elongated, imperforate, slat-mounting base members secured side-by-side across the frame,
(c) seal means interengaging the longitudinal sides of adjacent base members and forming a waterproof seal therebetween,
(d) a plurality of elongated load-supporting slats supported on the base members for longitudinal reciprocation,
(e) drive means supported by the frame and engaging the slats for reciprocating said slats,
(f) a liquid collection receptacle mounted on the frame and extending from one end of the base members for receiving the liquid content of a load supported on the conveyor,
(g) the base members including a fixed, hollow, load-supporting slat configured for disposition between reciprocative slats, and
(h) a waterproof plug closing the end of each hollow slat adjacent the liquid collection receptacle.

* * * * *